United States Patent Office 3,783,028
Patented Jan. 1, 1974

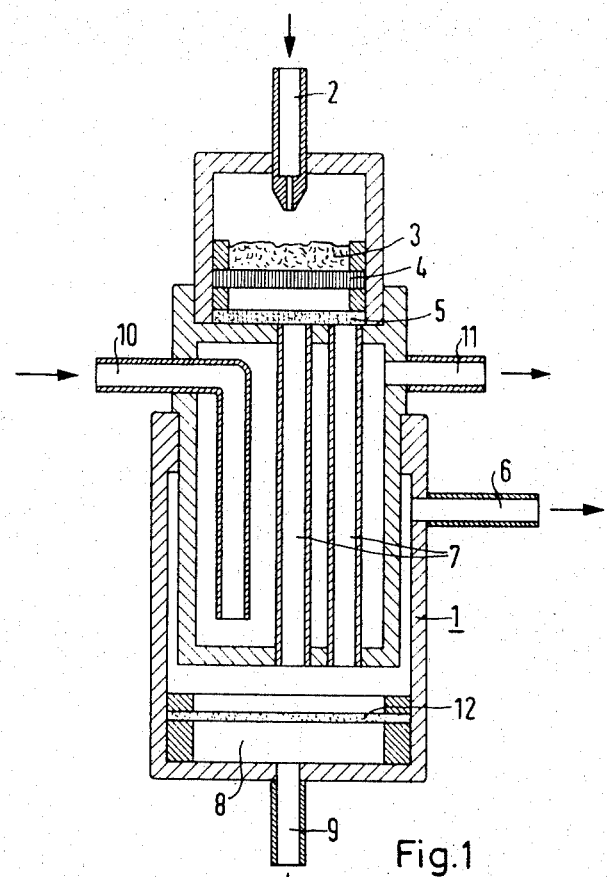
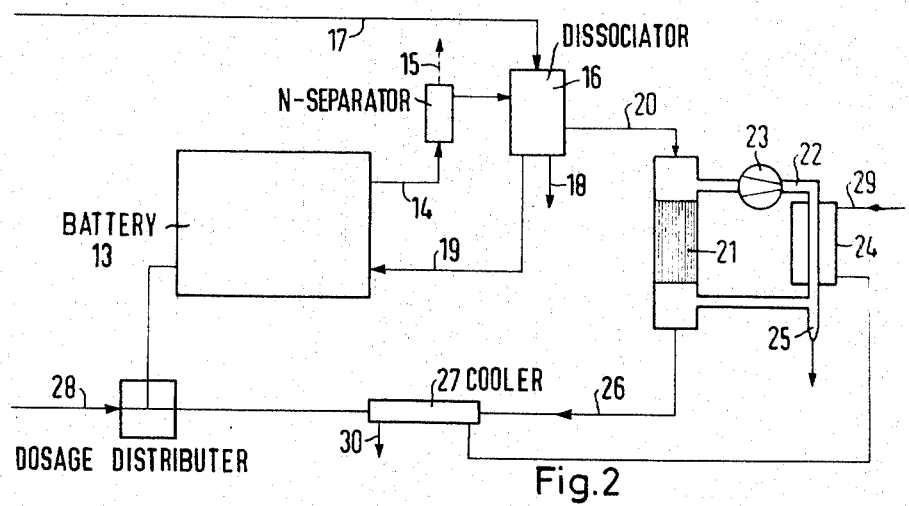

3,783,028
FUEL CELL AND APPARATUS FOR WATER REMOVAL BY EVAPORATING THE WATER FROM THE ELECTROLYTE OF FUEL ELEMENTS
Herbert Cnobloch, Hans Kohlmuller, and Manfredo Marchetto, Erlangen, Germany, assignors to Siemens Aktiengesellschaft, Erlangen, Berlin and Munich, Germany
Continuation of abandoned application Ser. No. 88,553, Nov. 12, 1970. This application Apr. 26, 1972, Ser. No. 247,902
Claims priority, application Germany, Nov. 12, 1969, P 19 56 726.1
Int. Cl. H01m 27/14
U.S. Cl. 136—86 C         2 Claims

ABSTRACT OF THE DISCLOSURE

A process for the removal of water by vaporizing the water from the electrolyte of fuel cell elements, wherein the hydrogen containing fuels are reacted and at least one reactant is produced through a preceding exothermal reaction. The heat energy which occurs during the exothermal reaction is used for the vaporization of the water. Apparatus for carrying out the process is also described.

---

This is a continuation of application Ser. No. 88,553, filed Nov. 12, 1970, now abandoned.

During the operation of fuel cell batteries wherein the hydrogen or hydrogen containing compounds are used as reactants, water is formed as a reaction product and dilutes the electrolyte thus reducing the efficiency of the battery. Various methods have previously been suggested to maintain the electrolyte concentration in fuel elements.

For example it had been proposed for fuel cell batteries, particularly batteries with small output to have a saturated solution of the substances dissolved and dissociated (decomposed) in the aqueous electrolyte, pass continuously from a storage container via a diffusion tube, into the electrolyte chambers of the fuel elements. The electrolyte which is diluted by the resultant reaction water is removed from the fuel elements via overflow tubes.

It is further known to remove the reaction water, formed during the operation of fuel elements, from the electrolyte through vaporization and subsequent condensation of the vapor. Thus, for example, in fuel elements with diffusion electrodes, the water formed may be so removed that the gaseous reactants, such as hydrogen and oxygen, are cycled and that the reaction water, as water vapor, is thereby removed from the fuel elements via the porous electrodes.

In order to achieve an improved efficiency, French Pat. 1,463,299 and French Pat. of Addition 93,105 suggest cycling the electrolyte effecting the water vapor saturation of the reaction gas used for water depletion, or of the inert gas, outside the fuel elements.

According to Austrian Pat. 277,341, the separation of the reaction water may be carried out so that the electrolyte is contacted with a diaphragm and the diffusion water vapor is precipitated (condensed) at a cooled condensation surface. This condensation surface may be porous as well as non-porous. The hydrostatic pressure of the electolyte is compensated in the diaphragm either by gas pressure or capillary depression pressure.

It was found, however, that the known methods used for water depletion through evaporation of the water from the electrolyte, are still unsatisfactory for some fuel cell batteries, with respect to their effectiveness. For example, this is always the case when the fuel elements are to be operated at low temperatures, as a result of which a water vapor saturation of the reaction gas or inert carrier gas, cannot be obtained.

Low operational temperatures are always desired when the reactant to be reacted is dissolved in the electrolyte itself and self dissociation or decomposition of said reactant takes place at an increase in temperature. If, for example, hydrazine is used as a fuel, self dissociation will occur at elevated temperatures. The losses occurring thereby cannot be compensated, however, through the better current voltage behavior of the fuel elements which are obtained at higher temperatures. Moreover, the behavior of all fuel cells during continuous operation is better at low temperatures. Finally, secondary reactions are promoted at higher temperatures with the formation of $NH_3$. These secondary reactions lead to additional impairments of the efficiency of the battery. Also, when synthetics are used as the frame material, the upper limit of the operational temperature is reduced.

It was therefore, the object of the present invention, to find a method for water removal, where the described shortcomings are eliminated.

The object of the invention relates to a method for water removal by vaporizing the water from the electrolyte of fuel elements wherein the hydrogen containing fuel materials are reacted and wherein at least one reactant is produced through a preceding exothermal reaction and to a device for performing said method.

The new method is characterized by the fact that the heat energy which occurs during the production of the reactant is used for the vaporization of the water.

According to our invention, the reactant may be produced of all such materials whose decomposition or reaction forms a substance, which reacts electrochemically at the anode or cathode, as, for example, oxygen or hydrogen, accompanied by heat emission. Thus, the boron hydrides or hydrides of alkali or earth alkali metals, such as $LiBH_4$, $NaBH_4$, $LiH$ and $CaH_2$ may be used as hydrogen delivering reactants. Also, the heat, which is released during the catalytical dissociation of hydrazine or during the dissociation of metals, especially of aluminum, may be used for vaporizing the reaction water.

A particularly suitable oxygen delivering reactant for the method of the invention is hydrogen peroxide which decomposes quickly at suitable catalysts such as silver, copper or manganese dioxide and which, in the form of a 70% aqueous solution per kilogram, delivers a thermal energy of 475 kcal./kg. Moreover, the oxygen thus produced is very pure so that additional purification is unnecessary.

The object of the invention will be disclosed in greater detail with reference to the enclosed figures wherein:

FIG. 1 schematically illustrates a peroxide decomposer; and

FIG. 2 schematically illustrates a fuel cell installation operated by hydrazine and oxygen, wherein the energy released during the catalytic decomposition of peroxide ($H_2O_2$) is used, according to the invention, to vaporize the reaction water.

FIG. 1 shows a decomposer 1 of V2A steel, through whose opening 2 hydrogen peroxide, which preferably contains water, is introduced. The hydrogen peroxide to be dosed is contacted with the catalyst 3, which in this instance, consists of silver and may be on a carrier, for example, an oxide such as $SiO_2$ or $Al_2O_3$. The catalyst material 3 is stored on a porous holder 4, such as a ceramic filter. The oxygen which forms during decomposition (dissociation) flows through the porous filter 5, which retains any possibly present impurities, then flows through tubes 7 and emerges from the decomposer or dissociator, via pipeline 6. The tube 6 may be connected directly with the gas chambers of the cathode, in the fuel elements.

The water which may be dosed with the hydrogen peroxide, as well as the water formed during dissociation, is present in the form of vapor and is being condensed in tubes 7. A sluice 12 is provided for a contiunous removal of the condensed water from the decomposer and this sluice consists of a porous disc, whose capillary pressure for water is higher than the oxygen pressure in the container. The expelled water may be temporarily collected in storage chamber 8 and then removed via tube 9.

The electrolyte which arrives from the fuel cell battery and is diluted with the reaction water, flows via tube 10 into the decomposer and absorbs via tubes 7, the heat formed during decomposition of the $H_2O_2$. The thus heated electrolyte may be introduced into the provided water depletion installation, directly via tube 11. The water is then removed in said water depletion installation, which may consist of a concentrator, a gas cycle, an electrolyte cooler and a water separator. Additional details may be found in French Pats. 1,463,299 and 93,105. The installation may also constitute a water depletion cell provided with a diaphragm, where the water vapor diffusing through the diaphragm, is precipitated at porous or non-porous condensation surfaces. In this regard, see Austrian Pat. No. 277,341.

FIG. 2 shows a fuel cell installation operated with hydrazine and oxygen wherein the energy released during the catalytical decomposition of $H_2O_2$ is used according to the invention, for evaporating the reaction water.

The water containing electrolyte flows from the battery 13, via line 14 and the nitrogen separator 15 into the peroxide decomposer 16, which, according to FIG. 1 consists of a container provided with equipment for catalytic dissociation of hydrogen peroxide, condensation of water vapor and sluicing of the condensation water. The supply of the hydrogen peroxide to the decomposer 16, takes place via line 17 and the removal of the formed water from the decomposer occurs at 18. The resultant oxygen flows via line 19, into the battery 13. The electrolyte, which emerges at 20 from the decomposer, is passed into the concentrator 21 where the heated up electrolyte in the cycle system 22, is contacted with inert gas. The recycling of the inert gas is effected through a fan 23. The water vapor absorbed in the concentrator 21 is condensed in the condenser 24 and removed from the fuel cell installation at 25, in the form of water. The concentrated electrolyte is supplied to the battery 13, via the connecting tube 26 and the cooler 27. The dose of hydrazine is added at 28. The coolant is introduced into the system at 29, and is removed from the system at 30.

If 800 kg. $H_2O_2$ (70%) and 375 kg. $N_2H_5OH$, are reacted within 84 hours in the installation according to FIG. 2, the delivered output during this period, amounts to 7 kg., with 8.75 kw. dissipated heat and 415 kg. water, which must be removed from the electrolyte (125 kg. 6 m. KOH). With this load, 5.25 kw. heat are obtained in the peroxide decomposer, which are additionally available for electrolyte heating. The heat which is available for water evaporation is increased in the present example by approximately 60%.

At a constant flow velocity, the temperature of the electrolyte was heated within the battery by the dissipated heat from 20 to 50° C. and in the peroxide decomposer from 50 to 80° C. As a result, the water depletion is considerably improved.

The water which flows at 25 from the water depletion installation contains about 1% hydrazine which quickly oxidizes with peroxide. The indicated hydrazine or peroxide consumption, does not reduced the effieciency of the installation to an appreciable degree.

Austrian Pat. No. 277,341 corresponds to U.S. patent application Ser. No. 694,252, filed Dec. 28, 1967, now abandoned.

We claim:

1. Device for performing a process for the removal of water by vaporizing the water from the electrolyte of fuel cells, wherein hydrogen or hydrogen containing fuels are reacted with oxygen, water occurring thereby as a reaction product which dilutes said electrolyte and wherein at least one gaseous reactant, prior to reaction in the fuel cell, is produced from an original material through an exothermal reaction outside said fuel cell, the heat energy which occurs during said exothermal reaction is used for the vaporization of water, said device comprising a container for producing the gaseous reactant, and together with a fuel cell or a fuel cell battery and a water depletion installation, is in an electrolyte cycle, said container is divided into three chambers, the first of said chambers is provided with an inlet for said original material, a catalyst for decomposing said original material, and a holding device for said catalyst, the second of said chambers has an inlet and an outlet for the electrolyte and the third of said chambers has an outlet for the gaseous reactant, which forms during the reaction of the original material, a sluice in the form of a porous filter for expelling the water formed during the exothermal reaction for producing the gaseous reactant, and an outlet for said water, the capillary pressure of said filter when in operation being higher than the gas pressure in said container so that the water passes through the filter while the gaseous reactant emerges from said third chamber through said gaseous reactant outlet, said container contains at least one heat exchange tube that connects the first and the third chambers and passes through the second chamber, said heat exchange tube is used for the exchange of heat, which forms during the exothermal reaction, from the gaseous products of said reaction which flow through the heat exchange tube, to the electrolyte which flows through the second chamber of the container.

2. The device of claim 1, wherein a second porous filter is between said first chamber and said second chamber.

References Cited

UNITED STATES PATENTS 3,455,743   7/1969   Huebscher _____ 136—86 C
3,479,224   11/1969  Jager _____ 136—86 C ALLEN B. CURTIS, Primary Examiner H. A. FEELEY, Assistant Examiner